United States Patent
Gibney, Jr. et al.

(10) Patent No.: US 6,565,142 B1
(45) Date of Patent: May 20, 2003

(54) VEHICLE DOOR INNER TRIM PANEL ASSEMBLY INCLUDING ELECTRICAL CONTROL PANEL

(75) Inventors: Terrence D. Gibney, Jr., New Hudson, MI (US); Michael J. Berta, Rochester Hills, MI (US); Gerald O. Morrison, Beverly Hills, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/003,955

(22) Filed: Oct. 31, 2001

(51) Int. Cl.⁷ .................................................. B60J 5/00
(52) U.S. Cl. ............................... 296/146.7; 296/146.5; 439/34
(58) Field of Search ........................... 296/146.7, 39.1, 296/146.5, 153; 361/627, 115; 439/34, 248, 246; 174/72; 49/502; 307/10.1

(56) References Cited

U.S. PATENT DOCUMENTS

| | | | | |
|---|---|---|---|---|
| 4,800,648 A | * | 1/1989 | Nakayama et al. | 296/146.7 |
| 4,824,164 A | * | 4/1989 | Nakayama et al. | 296/146.7 |
| 4,869,670 A | * | 9/1989 | Ueda et al. | 296/146.7 |
| 4,882,842 A | * | 11/1989 | Basson et al. | 296/146.7 |
| 4,907,836 A | * | 3/1990 | Ueda et al. | 296/146.7 |
| 4,943,109 A | * | 7/1990 | Skrbina et al. | 296/146.5 |
| 5,460,530 A | * | 10/1995 | Toba et al. | 439/34 |
| 5,642,999 A | * | 7/1997 | Kidd et al. | 439/34 |
| 5,667,398 A | * | 9/1997 | Kidd et al. | 439/248 |
| 5,805,402 A | * | 9/1998 | Maue et al. | 307/10.1 |
| 5,893,768 A | * | 4/1999 | Gawron et al. | 439/248 |
| 5,904,002 A | * | 5/1999 | Emerling et al. | 49/502 |
| 5,917,152 A | * | 6/1999 | Kameyama | 174/72 A |
| 5,936,818 A | * | 8/1999 | Maue et al. | 361/115 |
| 5,952,630 A | * | 9/1999 | Filion et al. | 296/153 |
| 5,975,933 A | * | 11/1999 | Yamaguchi et al. | 439/34 |
| 6,000,959 A | * | 12/1999 | Curtindale et al. | 439/246 |
| 6,036,501 A | * | 3/2000 | Wojewnik et al. | 439/34 |
| 6,053,758 A | * | 4/2000 | Kato et al. | 439/364 |
| 6,106,303 A | * | 8/2000 | Wojewnik | 439/34 |
| 6,126,469 A | * | 10/2000 | Yamaguchi | 439/310 |
| 6,135,778 A | * | 10/2000 | Ubelein | 439/34 |
| 6,142,556 A | * | 11/2000 | Tanaka et al. | 296/146.7 |
| 6,217,358 B1 | * | 4/2001 | Norizuki et al. | 439/247 |

* cited by examiner

Primary Examiner—Kiran Patel

(57) ABSTRACT

A vehicle door inner trim panel assembly (12) includes an inner trim panel (15) having a first electrical connector (18) and the assembly also includes an electrical control panel (36) having a second electrical connector (38) that is electrically connected to the first electrical connector upon mounting of the electrical control panel on a mount (16) of the inner trim panel. Electrical switches, (40, 42, 44 and 46) of the electrical control panel (36) control operation of associated vehicle electrical components.

10 Claims, 2 Drawing Sheets

VEHICLE DOOR INNER TRIM PANEL ASSEMBLY INCLUDING ELECTRICAL CONTROL PANEL

BACKGROUND OF THE INVENTION

1. Field of the Invention

This invention relates to a vehicle door inner trim panel assembly including an inner trim panel and also including an electrical control panel that is mounted on the inner trim panel and operable to control associated vehicle electrical components by manual operation of electrical switches.

2. Background Art

Vehicle doors conventionally include inner trim panel assemblies that are mounted on associated door outer structures usually with securement being provided by suitable fasteners. Such inner trim panels have previously been constructed as assemblies that include an electrical control panel mounted on the inner trim panel also with the securement provided by suitable fasteners. Previously, the electrical control panels, which have been constructed as bolsters including an armrest, have included an electrical switch panel with switches having connectors that are manually connected to associated connectors on the control panel or the door outer structure prior to mounting of the switch panel on the control panel. Thus, the mounting of the electrical control panel and its electrical switch panel on the inner trim panel is a two step process whose cost is necessarily reflected in the cost of the door inner trim panel assembly.

SUMMARY OF THE INVENTION

An object of the present invention is to provide an improved vehicle door inner trim panel assembly.

In carrying out the above object, the vehicle door inner trim panel assembly of the invention includes an inner trim panel defining an electrical control panel mount. A first electrical connector is supported by the inner trim panel adjacent the electrical control panel mount and has electrical connections for electrically connecting to electrical components of the associated vehicle with which the door inner trim panel assembly is to be utilized. An electrical control panel of the assembly is supported by and secured to the mount of the inner trim panel and includes a second electrical connector that is electrically connected to the first electrical connector by the mounting of the electrical control panel on the inner trim panel. Electrical switches on the electrical control panel control operation of the associated vehicle components with the first and second electrical connectors connected to each other.

In the preferred construction of the vehicle door inner trim panel assembly, the electrical control panel mount is embodied by a mounting opening in the inner trim panel for receiving and supporting the electrical control panel. The inner trim panel includes a mounting surface that defines the mounting opening and extends completely around the electrical control panel upon being received within the mounting opening upon mounting on the inner trim panel.

The electrical control panel is disclosed as being embodied by a bolster including an armrest, and the bolster includes a pull handle for permitting manual movement of the associated door upon assembly of the inner trim panel assembly to the door. The bolster includes a forwardly inclined portion that mounts the switches forwardly of the armrest.

The construction of the electrical control panel preferably has a generally teardrop shape that points forwardly with respect to the inner trim panel assembly upon mounting on the trim panel. The electrical control panel mount of the inner trim panel has its mounting surface provided with a teardrop shape that points in a forward direction and defines a forwardly pointing teardrop shaped mounting opening that receives the teardrop shaped electrical control panel upon mounting thereof on the inner trim panel.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
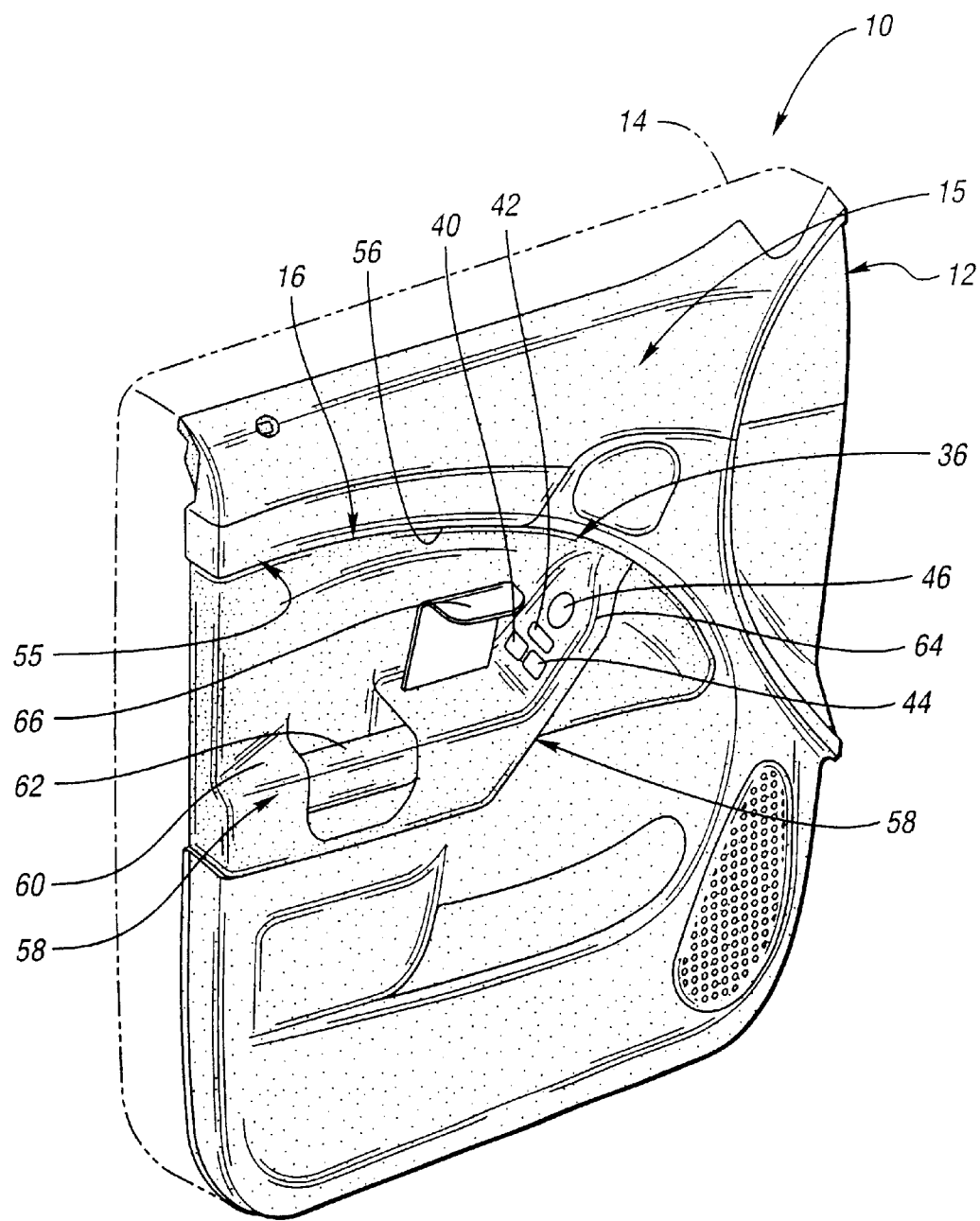
FIG. 1 is a perspective view of a vehicle door inner trim panel assembly that is constructed in accordance with the present invention and mounted on a phantom line indicated outer door structure to provide a vehicle door.
Figure 2:
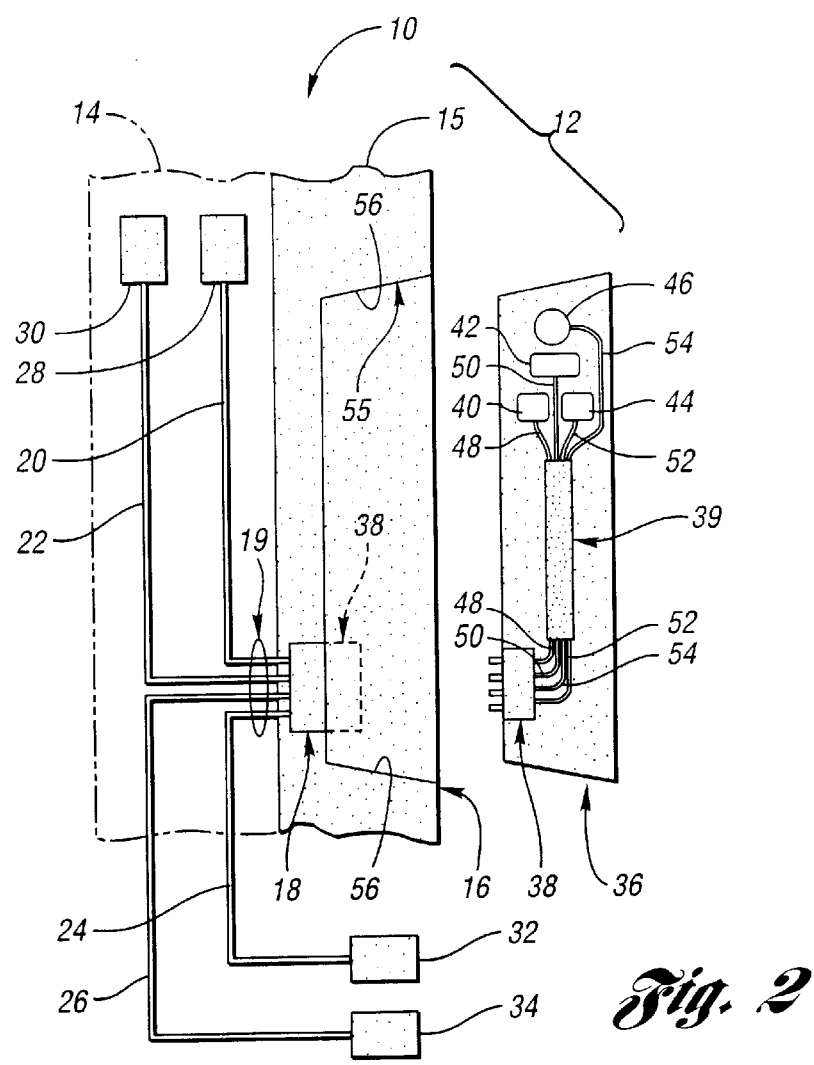
FIG. 2 is a schematic view that illustrates the construction of an inner trim panel and an electrical control panel of the assembly.

With reference to FIG. 1, a vehicle door generally indicated by 10 includes an inner trim panel assembly 12 that is constructed in accordance with the invention and is secured to a phantom line indicated door outer structure 14 to provide the vehicle door. The assembly 12 includes an inner trim panel 15 that has an electrical control panel mount 16 whose construction is hereinafter more fully described. A first electrical connector 18 of the assembly is supported in any suitable manner on the inner trim panel 12 as shown in FIG. 2 adjacent the electrical control panel mount 16 and has an electrical wire bundle 19 having wire connections 20, 22, 24 and 26 to respective electrical components 28, 30, 32 and 34 of the associated vehicle with which the door inner trim panel assembly is to be utilized. More specifically, the electrical components may be located interiorly within the door 10 as illustrated by the components 28 and 30 which may be a power operated door lock, a power operated window control, a power operated door mounted mirror, or door accessory lighting etc. Likewise, the components as illustrated by the components 32 and 34 may be located exteriorly of the door such as an associated vehicle power operated seat control, vehicle interior lighting, etc.

Of course, there may be any number of electrical components both within and exteriorly of the door.

Figure 3:
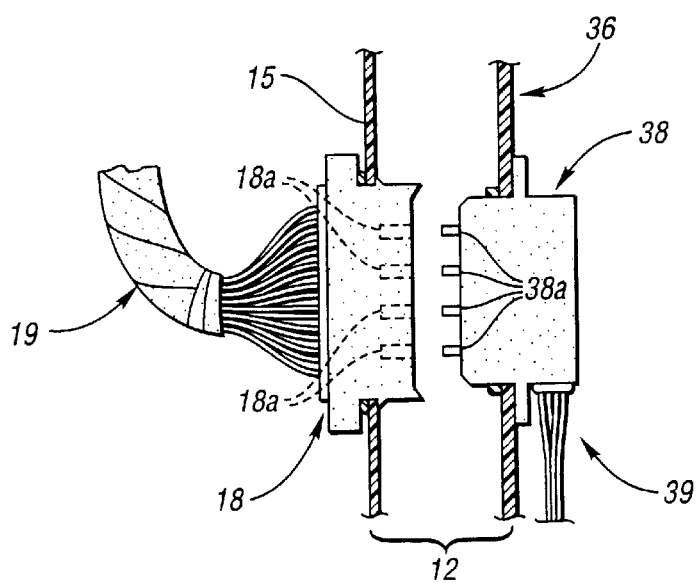
FIG. 3 is an enlarged view of a portion of FIG. 2 to illustrate electrical connectors of the assembly.

With combined reference to FIGS. 1 and 2, the vehicle door inner trim panel assembly 12 also includes an electrical control panel 36 supported by and secured to the mount 16 of the inner trim panel in any suitable manner such as by an interference fit or suitable fasteners etc. The electrical control panel includes a second electrical connector 38 that is electrically connected to the first electrical connector 18 by the mounting of the electrical control panel 36 on the inner trim panel 15. More specifically, as shown in FIG. 3, the first electrical connector 18 has female sockets 18a and the second electrical connector 38 has male prongs 38a. As the electrical control panel 36 is moved toward and mounted on the mount 16, the female sockets 18a and male prongs 38a of the first and second electrical connectors 18 and 38 electrically mate with each other so that the connectors provide a connector assembly. Thus, the mounting of the electrical control panel provides the electrical connection of the control panel without any further assembly step. Electrical switches 40, 42, 44 and 46 of the electrical control panel are connected by a wire bundle 39 having wire electrical connections 48, 50, 52 and 54, respectively, to the second connector 38 so as to provide control of the associated vehicle electrical components 28, 30, 32 and 34, respectively.

While the electrical connectors have been illustrated as including female sockets and male prongs that mate to provide electrical connection upon the mounting of the electrical control panel on the inner trim panel, other electrical contacts such as button contacts, leaf spring contacts, etc. can also be used so long as the electrical contact is made by the electrical control panel mounting on the inner trim panel.

In the preferred construction of the inner trim panel assembly 12, the electrical control panel mount 16 is embodied by an opening 55 in the inner trim panel for receiving and supporting the electrical control panel 36. More specifically, the inner trim panel 15 includes a mounting surface 56 that extends as shown in FIG. 1 completely around the electrical control panel 36 upon being received within the mounting opening upon mounting on the inner trim panel.

With continuing reference to FIG. 1, the electrical control panel 36 is constructed as bolster 58 including an armrest 60. The bolster 58 also includes a pull handle 62 for permitting manual movement of the associated door upon assembly of the inner trim panel assembly to the door. The bolster in addition includes a forwardly inclined portion 64 that mounts the switches 40, 42, 44 and 46 forwardly of the armrest 60. A door release handle 66 is located between the door pull 62 and the inclined portion 64.

As illustrated in FIG. 1, the electrical control panel 36 has a generally teardrop shape that points in a forward direction with respect to the inner trim panel assembly upon mounting on the trim panel. More specifically, the electrical control panel mount 16 has its mounting surface 56 provided with a teardrop shape that points forwardly and defines the mounting opening 55 that receives the teardrop shaped electrical control panel upon the mounting on the inner trim panel.

While the preferred embodiment of the invention has been described in detail, those familiar with the art to which this invention relates will recognize various alternative designs and embodiments for practicing the invention as defined by the following claims.

What is claimed is:

1. A vehicle door inner trim panel assembly comprising:
   an inner trim panel defining an electrical control panel mount;
   a first electrical connector supported by the inner trim panel adjacent the electrical control panel mount and having electrical connections for electrically connecting to electrical components of the associated vehicle with which the door inner trim panel assembly is to be utilized;
   an electrical control panel supported by and secured to the mount of the inner trim panel;
   the electrical control panel including a second electrical connector that is electrically connected to the first electrical connector by the mounting of the electrical control panel on the inner trim panel; and
   electrical switches on the electrical control panel for controlling operation of the associated vehicle electrical components with the first and second electrical connectors connected to each other.

2. A vehicle door inner trim panel assembly as in claim 1 wherein the electrical control panel mount comprises a mounting opening in the inner trim panel for receiving and supporting the electrical control panel.

3. A vehicle door inner trim panel assembly as in claim 2 wherein the inner trim panel includes a mounting surface that defines the mounting opening and extends completely around the electrical control panel upon being received within the mounting opening upon mounting on the inner trim panel.

4. A vehicle door inner trim panel assembly as in claim 1 wherein the electrical control panel comprises a bolster including an armrest.

5. A vehicle door inner trim panel assembly as in claim 4 wherein the bolster includes a pull handle for permitting manual movement of the associated door upon assembly of the inner trim panel assembly to the door.

6. A vehicle door inner trim panel assembly as in claim 4 wherein the bolster includes a forwardly inclined portion that mounts the switches forwardly of the armrest.

7. A vehicle door inner trim panel assembly as in claim 1 wherein the electrical control panel has a generally tear drop shape that points in a forward direction with respect to the inner trim panel upon mounting on the trim panel.

8. A vehicle door inner trim panel assembly as in claim 7 wherein the electrical control panel mount of the inner trim panel comprises a tear drop shaped mounting surface that points in a forward direction and defines a forwardly pointing tear drop shaped mounting opening that receives the teardrop shaped electrical control panel upon mounting thereof on the inner trim panel.

9. A vehicle door inner trim panel assembly comprising:
   an inner trim panel including a mounting surface defining a mounting opening that provides an electrical control panel mount;
   a first electrical connector supported by the inner trim panel adjacent the mounting opening of the electrical control panel mount and having electrical connections for electrically connecting to electrical components of the associated vehicle with which the door inner trim panel assembly is to be utilized;
   an electrical control panel received by and supported within the mounting opening of the inner trim panel;
   the electrical control panel including a second electrical connector that is electrically connected to the first electrical connector by the mounting of the electrical control panel within the mounting opening in the inner trim panel; and electrical switches on the electrical control panel for controlling operation of the associated vehicle electrical components with the first and second electrical connectors connected to each other.

10. A vehicle door inner trim panel assembly comprising:

an inner trim panel including a mounting surface defining a mounting opening of a forwardly pointing teardrop shape that provides an electrical control panel mount;

a first electrical connector supported by the inner trim panel adjacent the mounting opening of the electrical control panel mount and having electrical connections for electrically connecting to electrical components of the associated vehicle with which the door inner trim panel assembly is to be utilized;

an electrical control panel embodied by a bolster that includes an armrest and is received by and supported within the mounting opening of the inner trim panel;

the electrical control panel including a second electrical connector that is electrically connected to the first electrical connector by the mounting of the electrical control panel within the mounting opening in the inner trim panel; and electrical switches on the electrical control panel for controlling operation of the associated vehicle electrical components with the first and second electrical connectors connected to each other.

* * * * *